United States Patent
Yeh et al.

(10) Patent No.: US 12,395,212 B2
(45) Date of Patent: Aug. 19, 2025

(54) MODULATION METHOD AND MODULATION DEVICE FOR MODULATING BEAMFORMING

(71) Applicant: Innolux Corporation, Miaoli County (TW)

(72) Inventors: Chen-Lin Yeh, Miaoli County (TW); Yan-Zheng Wu, Miaoli County (TW); Jen-Hai Chi, Miaoli County (TW); Chih-Yung Hsieh, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 109 days.

(21) Appl. No.: 18/533,195

(22) Filed: Dec. 8, 2023

(65) Prior Publication Data
US 2024/0223246 A1  Jul. 4, 2024

Related U.S. Application Data

(60) Provisional application No. 63/436,876, filed on Jan. 4, 2023.

(30) Foreign Application Priority Data

Aug. 30, 2023 (CN) .......................... 202311106908.6

(51) Int. Cl.
*H04B 7/0456* (2017.01)
*H04B 7/0426* (2017.01)
*H04B 7/155* (2006.01)

(52) U.S. Cl.
CPC .......... *H04B 7/0478* (2013.01); *H04B 7/043* (2013.01); *H04B 7/15564* (2013.01)

(58) Field of Classification Search
CPC .. H04B 7/0478; H04B 7/043; H04B 7/15564; H04B 7/0617
See application file for complete search history.

(56) References Cited

U.S. PATENT DOCUMENTS

| | | | |
|---|---|---|---|
| 2021/0273700 A1* | 9/2021 | Wyckoff | H04L 27/3405 |
| 2023/0171692 A1* | 6/2023 | Lee | H04W 74/0808 |
| | | | 370/311 |

FOREIGN PATENT DOCUMENTS

CN   109952513   6/2019

* cited by examiner

*Primary Examiner* — Vineeta S Panwalkar
(74) *Attorney, Agent, or Firm* — JCIPRNET

(57) ABSTRACT

A modulation method and a modulation device for modulating beamforming are provided. The modulation method includes: providing a memory element that stores a beamforming table; providing a driving element; providing a plurality of modulation element groups; providing a signal source to provide at least one initial electromagnetic wave to the modulation element groups; providing a plurality of driving signals corresponding to the modulation element groups according to the beamforming table by the driving element; modulating the at least one initial electromagnetic wave to be a main wave beam with a specific radiation waveform according to the drive signals by the modulation element groups.

20 Claims, 12 Drawing Sheets

BFT

| Radiation direction | Voltage value of driving signal | Region |
|---|---|---|
| (θ1, φ1) | V1 | #1 |
| (θ1, φ1) | V2 | #2 |
| ⋮ | ⋮ | ⋮ |
| (θ2, φ2) | V1' | #1 |
| (θ2, φ2) | V2' | #2 |
| ⋮ | ⋮ | ⋮ |

C1 → Radiation direction
C2 → Voltage value of driving signal
C3 → Region

R1: first group (rows with (θ1, φ1))
R2: second group (rows with (θ2, φ2))

FIG. 3

| | C8' → Voltage value of driving signal | C9' → Resonance frequency | C10' → Modulation intensity | C11' → Modulation phase | C12' → Region |
|---|---|---|---|---|---|
| R3 | VB1 | RF1 | I1 | PH1 | #1 |
|    | VB1' | RF2 | I2 | PH2 | #1 |
|    | ... | ... | ... | ... | ... |
| R4 | VB2 | RF1 | I1 | PH1 | #2 |
|    | VB2' | RF2 | I2 | PH2 | #2 |
|    | ... | ... | ... | ... | ... |

RLUT

FIG. 7

MODULATION METHOD AND MODULATION DEVICE FOR MODULATING BEAMFORMING

CROSS-REFERENCE TO RELATED APPLICATION

This application claims the priority benefit of U.S. provisional application Ser. No. 63/436,876, filed on Jan. 4, 2023, and China application Ser. No. 202311106908.6, filed on Aug. 30, 2023. The entirety of each of the above-mentioned patent applications is hereby incorporated by reference herein and made a part of this specification.

BACKGROUND

Technical Field

The disclosure relates to a modulation method and a modulation device; more particularly, the disclosure relates to a modulation method and a modulation device for modulating beamforming.

Description of Related Art

In the realm of modulation devices, the utilization of a plurality of modulation elements is a common practice to modulate electromagnetic waves and generate a main wave beam with the desired beamforming attributes. Nevertheless, the variability in the characteristics of these modulation elements may arise due to process parameter tolerances or disparities across different production batches. Besides, variations in the configuration of these modulation elements within a modulation device may also introduce alterations in the beamforming characteristics of the main wave beam based on the different setting regions in the modulation device or different arrangement methods. Given these considerations, research for experts in this field centers on the development of methodologies to fine-tune the modulation elements to ensure that the modulation device consistently produces the main wave beam that aligns with the intended beamforming specifications.

SUMMARY

The disclosure provides a modulation method and a modulation device for modulating beamforming.

According to an embodiment of the disclosure, a modulation method including following steps is provided. A memory element storing a beamforming table is provided. A driving element is provided, where the driving element is electrically connected to the memory element. A plurality of modulation element groups are provided, where the modulation element groups are electrically connected to the driving element. A signal source is provided, where the signal source provides at least one initial electromagnetic wave to the modulation element groups. A plurality of driving signals corresponding to the modulation element groups are provided by the driving element according to the beamforming table. The at least one initial electromagnetic wave is modulated to a main wave beam with a specific radiation waveform by the modulation element groups according to the driving signals.

According to an embodiment of the disclosure, a modulation device including a memory element, a driving element, a plurality of modulation element groups, and a signal source is provided. The memory element stores a beamforming table. The driving element is electrically connected to the memory element. The modulation element groups are electrically connected to the driving element. The signal source provides at least one initial electromagnetic wave to the modulation element groups. The driving element provides a plurality of driving signals corresponding to the modulation element groups according to the beamforming table. The modulation element groups modulate the at least one initial electromagnetic wave to a main wave beam with a specific radiation waveform according to the driving signals.

In light of the foregoing, according to the modulation method and in the modulation device provided in one or more embodiments of the disclosure, the modulation element groups are driven according to the beamforming table, whereby the at least one initial electromagnetic wave is modulated to the main wave beam having the specific radiation waveform. As such, the beamforming specifications of the main wave beam may be modulated based on the beamforming table.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 is a schematic view illustrating a beamforming table according to an embodiment of the disclosure.

FIG. 7 is a schematic view illustrating a combined lookup table according to an embodiment of the disclosure.

DETAILED DESCRIPTION OF DISCLOSED EMBODIMENTS

Figure 1:
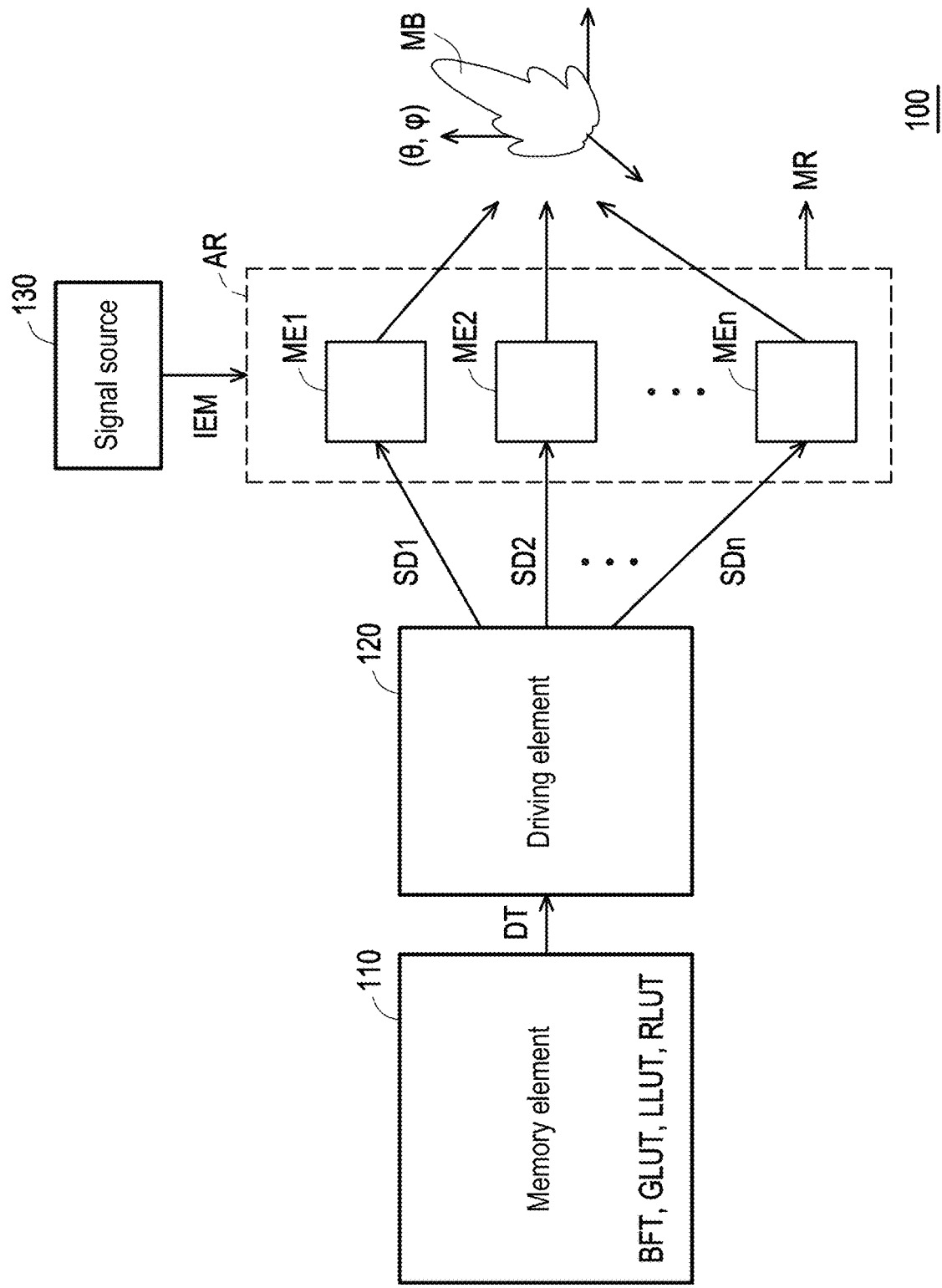
FIG. 1 is a schematic view illustrating a modulation device according to an embodiment of the disclosure.

The disclosure may be understood with reference to the following detailed description with the drawings. Note that for clarity of description and ease of understanding, the drawings of the disclosure show a part of an electronic device, and certain components in the drawings may not be drawn to scale. In addition, the number and size of each device shown in the drawings simply serve for exemplifying instead of limiting the scope of the disclosure.

Certain terminologies are used throughout the description and the appended claims to refer to specific components. As to be understood by those skilled in the art, electronic device manufacturers may refer to a component by different names. Herein, it is not intended to distinguish between components that have different names instead of different functions. In the following description and claims, terminologies such as "include," "comprise," and "have" are used in an open-ended manner, and thus should be interpreted as "including, but not limited to". Therefore, the terminologies "include," "comprise," and/or "have" used in the description of the disclosure denote the presence of corresponding features, areas, steps, operations, and/or components but are not limited to the presence of one or more corresponding features, areas, steps, operations, and/or components.

It should be understood that when one element is referred to as being "coupled to", "connected to", or "conducted to" another element, the one element may be directly connected to the another element with electrical connection established, or intervening elements may also be present in between these elements for electrical interconnection (indirect electrical connection). Comparatively, when one element is referred to as being "directly coupled to", "directly conducted to", or "directly connected to" another element, no intervening elements are present in between.

In the context of the specification and claims, the utilization of ordinal indicators like "first," "second," "third," and so forth, in relation to modifying elements, does not inherently suggest or signify the presence of any preceding ordinal numbers for said elements. Nor do these indicators imply a sequential relationship between elements, either in terms of their assembly or within the manufacturing process. The primary purpose of these ordinal indicators is to unambiguously differentiate an element bearing a specific name from another element bearing the same name. It should be noted that while the indicators employed in the claims and specification might diverge, the ordinal assignment can also differ; consequently, an element indicated as being the "first" in the specification might correspond to the "second" element as indicated in the claims.

The electronic device provided in the disclosure may include, but is not limited to, a radio frequency (RF) device or sensing device. The electronic device may include a variable capacitor, a variable resistor, a variable inductor, a phase shifter, an amplifier, a biometric sensor, a graphene sensor, other suitable elements, or a combination thereof, which should however not be construed as limitations in the disclosure. The RF device may include a frequency selective surface (FSS), an electromagnetic band gap (EBG) structure, an RF-Filter, a polarizer, a resonator, an antenna, or a combination thereof, which should however not be construed as limitations in the disclosure. The RF device may include a modulation device, and a modulation device 100 may be applied to, for instance, a communication field, a radar/lidar field, or other suitable fields/technologies, such as a phase modulation device, a frequency modulation device, or a combination thereof, but the disclosure is not limited thereto. The modulation device may be, for instance, a liquid crystal antenna or a varactor antenna, but the disclosure is not limited thereto. The modulation device may for instance, include an antenna splicing device, but the disclosure is not limited thereto. It should be noted that the electronic device may refer to any arrangement and combination of the foregoing, but the disclosure is not limited thereto. In addition, a shape of the electronic device may be rectangular, circular, polygonal, a shape with curved edges, or other suitable shapes. The electronic device may have peripheral systems, such as a driving system, a control system, etc., to support the RF device, but the disclosure is not limited thereto. The sensing device may include a camera or an infrared sensor, but the disclosure is not limited thereto. In some embodiments, the sensing device may further include a flashlight, an infrared (IR) light source, other sensors, electronic elements, or a combination thereof, but the disclosure is not limited thereto.

In one or more embodiments of the disclosure, terminologies such as "pixel" or "pixel unit" are used as a unit for describing a specific region including at least one functional circuit for at least one specific function. The region of a "pixel" depends on the unit for providing a specific function. Adjacent pixels may share the same parts or wires, but may also include their own specific parts therein. For instance, adjacent pixels may share the same scan line or the same data line, but the pixels may also have their own transistors or capacitors.

Note that features in different embodiments described below may be replaced, recombined, or mixed with each other to form another embodiment without departing from the spirit of the disclosure.

Figure 2:
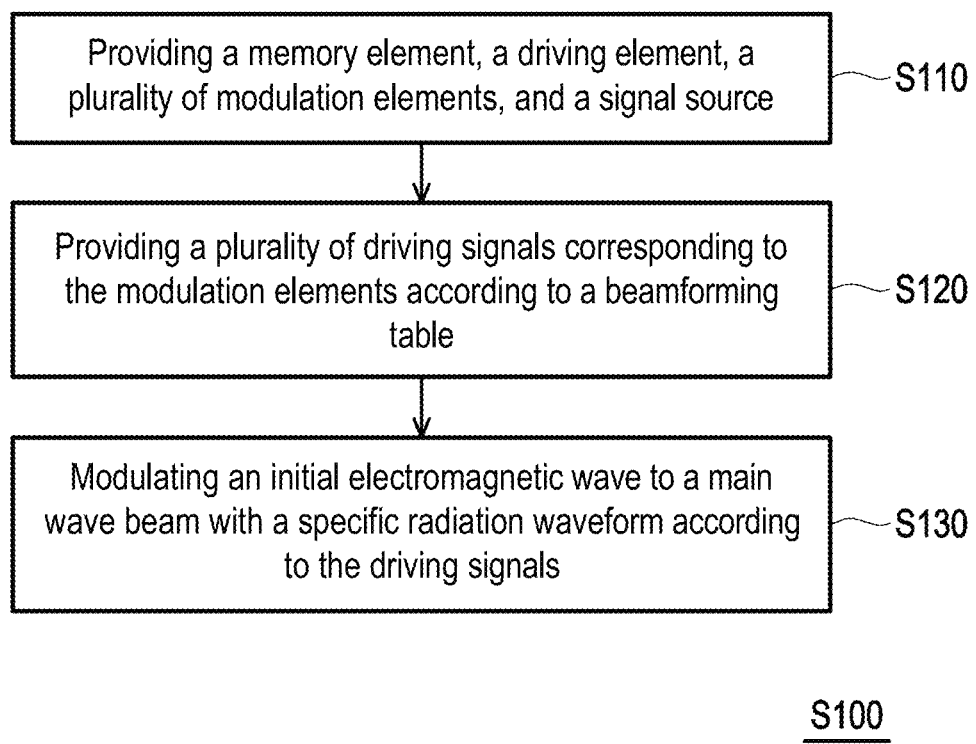
FIG. 2 is a flowchart illustrating a modulation method according to an embodiment of the disclosure.

Please refer to FIG. 1 and FIG. 2. FIG. 1 is a schematic view illustrating a modulation device according to an embodiment of the disclosure. FIG. 2 is a flowchart illustrating a modulation method according to an embodiment of the disclosure. In the present embodiment, a modulation method S100 includes steps S110-S130. In step S110, a memory element 110, a driving element 120, modulation element groups ME1-MEn, and a signal source 130 of the modulation device 100 are provided. The memory element 110 stores a beamforming table BFT. The driving element 120 is electrically connected to the memory element 110. The modulation element groups ME1-MEn are electrically connected to the driving element 120. In addition, the signal source 130 provides an initial electromagnetic wave IEM to the modulation element groups ME1-MEn. In the present embodiment, the number of the initial electromagnetic wave IEM may be one or more.

In step S120, the driving element 120 provides driving signals SD1-SDn corresponding to the modulation element groups ME1-MEn according to a beamforming table BFT. In the present embodiment, the driving element 120 reads the beamforming table BFT. The driving element 120 generates the driving signals SD1-SDn based on data DT of the beamforming table BFT, provides the driving signal SD1 to the modulation element group ME1, provides the driving signal SD2 to the modulation element group ME2, and so on. In the present embodiment, the driving signals SD1-SDn may be voltage signals, which should however not be construed as a limitation in the disclosure.

In step S130, the modulation element groups ME1-MEn modulate the initial electromagnetic wave IEM to a main wave beam MB with a specific radiation waveform according to the driving signals SD1-SDn. In the present embodiment, the specific radiation waveform of the main wave beam MB at least includes a radiation direction and a radiation intensity. The radiation direction of the main wave beam MB is defined by a polar angle ($\theta$) and an azimuth angle ($\varphi$) in a spherical coordinate system, which should however not be construed as a limitation in the disclosure.

According to the modulation method S100 and in the modulation device 100, it is worth mentioning that the modulation element groups ME1-MEn are driven according to the beamforming table BFT, thereby modulating the initial electromagnetic wave IEM to the main wave beam MB with the specific radiation waveform. By applying the modulation method S100 and the modulation device 100, the beamforming table BFT may be applied to improve the accuracy of a direction of the main wave beam MB. As such, the beamforming specifications of the main wave beam MB may be adjusted based on the beamforming table BFT.

In the present embodiment, each of the modulation element groups ME1-MEn includes at least one modulation element.

In the present embodiment, the memory element 110 may be elements known to people skilled in the pertinent art, such as memory circuits, memory chips, and so on, which should however not be construed as a limitation in the disclosure. The memory element 110 may include a transistor, a capacitor, an inverter, or a combination of the above.

In the present embodiment, the driving element 120 may be a circuit, such as a digital-to-analog conversion (DAC) circuit, a signal generator, and so forth, which should however not be construed as a limitation in the disclosure. The driving element may include at least a plurality of transistors.

In the present embodiment, the signal source 130 may be a feeding line or a waveguide configured to receive or transmit the initial electromagnetic wave IEM. In some embodiments, the signal source 130 may be a generator configured to generate the initial electromagnetic wave IEM, which should however not be construed as a limitation in the disclosure.

In the present embodiment, at least one modulation element of each of the modulation element groups ME1-MEn is an active or passive element, e.g., a varactor element, a varactor diode, or a radio frequency radiation element, which should however not be construed as a limitation in the disclosure.

In the present embodiment, the beamforming table BFT includes a plurality of radiation directions. These radiation directions correspond to regions occupied by the modulation element groups ME1-MEn and the driving signals SD1-SDn. Each of the radiation directions includes a polar angle and an azimuth angle in a spherical coordinate system.

Please refer to FIG. 1 and FIG. 3. FIG. 3 is a schematic view illustrating a beamforming table according to an embodiment of the disclosure. FIG. 3 shows part of the content of the beamforming table BFT. In the present embodiment, the beamforming table BFT includes columns C1-C3. The column C3 records the regions occupied by the modulation element groups ME1-MEn. The column C1 records the radiation directions of the beamforming table BFT. The column C2 records the driving signal received by at least one modulation element of the modulation element group corresponding to the region.

In the present embodiment, the region R1 in the beamforming table BFT is taken as an example; if the radiation direction of the beamforming table BFT is to be implemented as ($\theta$1, $\varphi$1), the driving element 120 provides a driving signal having a voltage value V1 to at least one modulation element group located in a region #1 and provides a driving signal having a voltage value V2 to at least one modulation element group located in a region #2.

The region R2 in the beamforming table BFT is taken as an example; if the radiation direction of the beamforming table BFT is to be implemented as ($\theta$2, $\varphi$2), the driving element 120 provides a driving signal having a voltage value V1' to at least one modulation element located in the region #1 and provides a driving signal having a voltage value V2' to at least one modulation element located in the region #2.

In the present embodiment, the region #1 corresponds to the first region occupied by the modulation element group.

The region #2 corresponds to the second region occupied by the modulation element group. The first region and the second region are not overlapped with each other.

Figure 4:
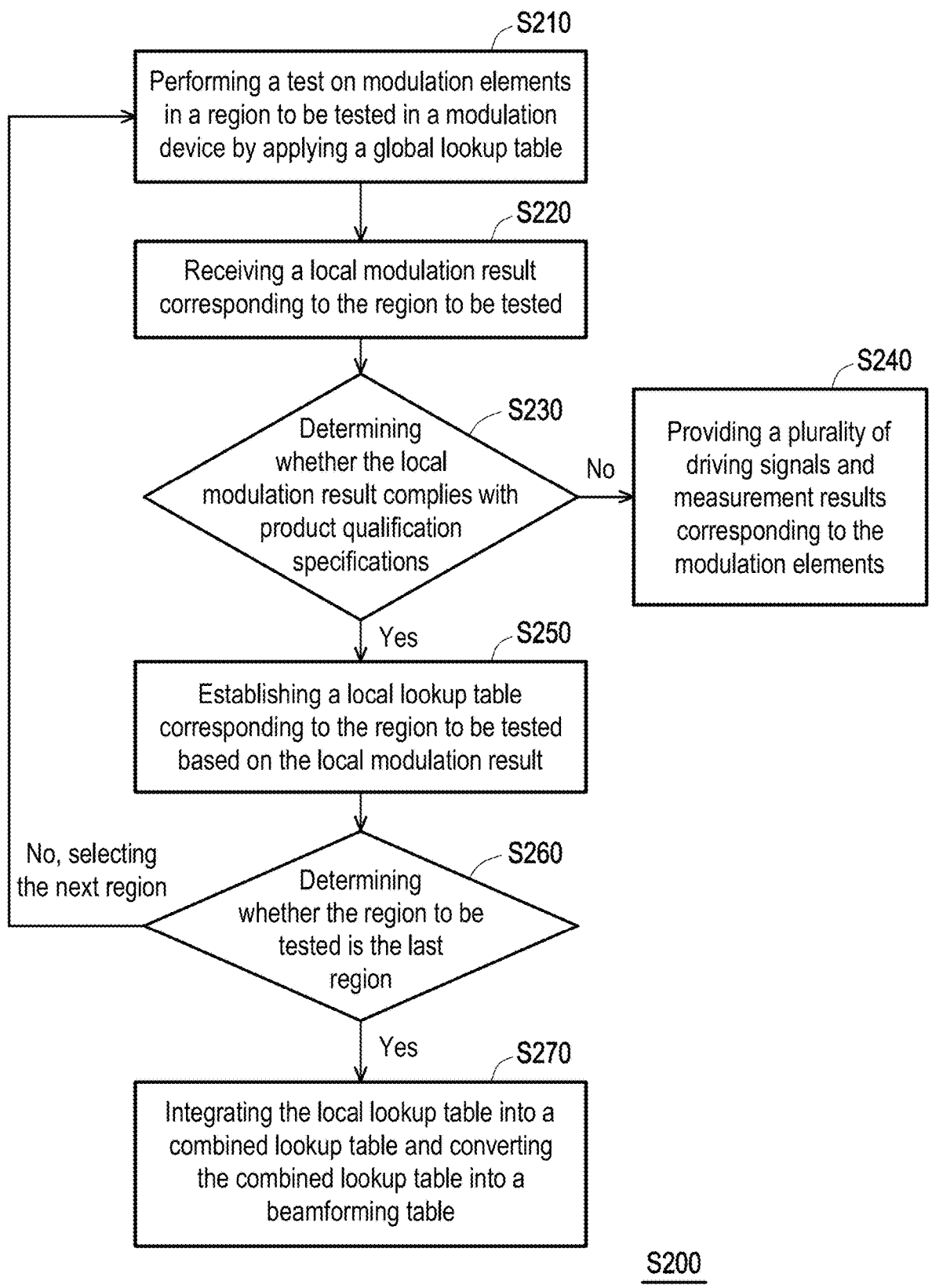
FIG. 4 is a flowchart illustrating a modulation method according to an embodiment of the disclosure.
Figure 5:
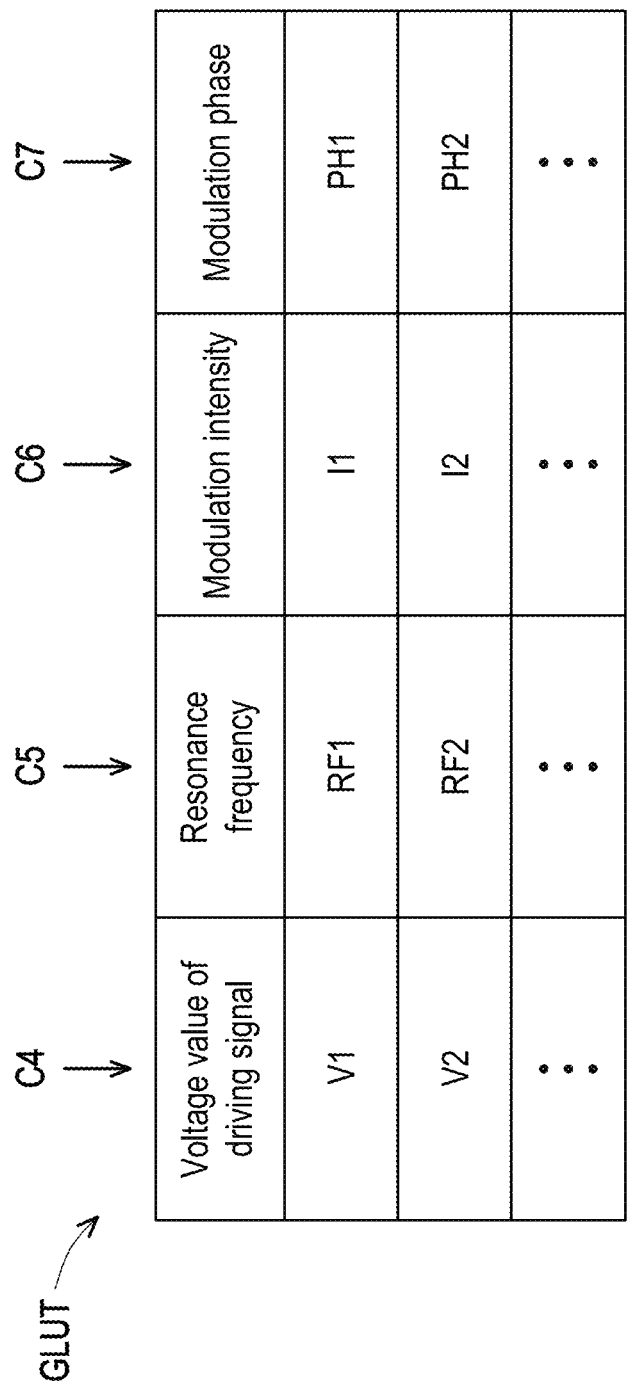
FIG. 5 is a schematic view illustrating a global lookup table according to an embodiment of the disclosure.
Figure 6:
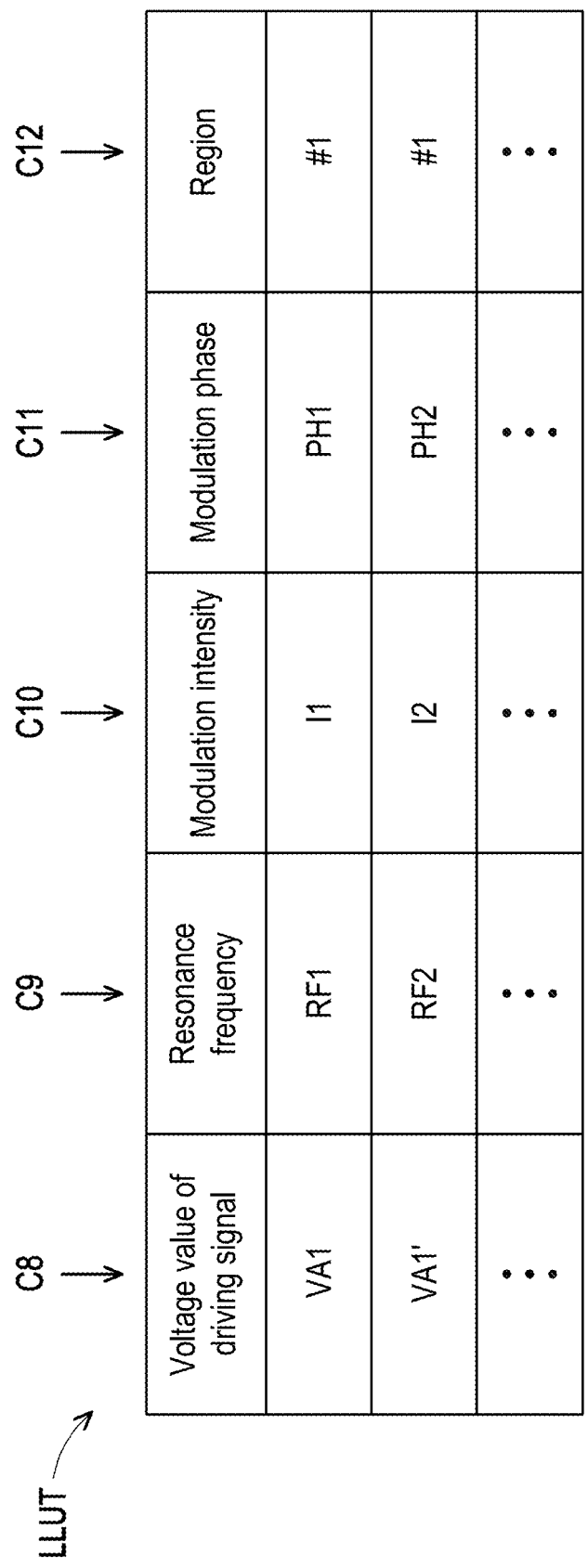
FIG. 6 is a schematic view illustrating a local lookup table according to an embodiment of the disclosure.

Please refer to FIG. 1 and FIG. 4 to FIG. 7. FIG. 4 is a flowchart illustrating a modulation method according to an embodiment of the disclosure. FIG. 5 is a schematic view illustrating a global lookup table according to an embodiment of the disclosure. FIG. 6 is a schematic view illustrating a local lookup table according to an embodiment of the disclosure. FIG. 7 is a schematic view illustrating a combined lookup table according to an embodiment of the disclosure. A modulation method S200 is applicable to the modulation device 100. In the present embodiment, the modulation method S200 includes steps S210-S270. Based on the modulation method S200, the modulation device 100 applies a global lookup table GLUT to perform a test on at least one modulation element in at least one region in the modulation device 100 one by one. In the present embodiment, the modulation element groups ME1-MEn are disposed in an active region AR of the modulation device 100. The modulation element groups ME1-MEn may be arranged as a modulation element array in the active region AR, and the active region AR may be divided into at least one region. For instance, the region may be a micro-region or a local region. Therefore, the modulation device 100 may perform near-field measurement or far-field measurement on at least one modulation element group in the region.

In the present embodiment, the global lookup table GLUT includes columns C4-C7. The column C4 records voltage values of the driving signals SD1-SDn received by the modulation element groups ME1-MEn. The column C5 records resonance frequencies of the modulation element groups ME1-MEn. The column C6 records modulation intensities of the modulation element groups ME1-MEn. The column C7 records modulation phases of the modulation element groups ME1-MEn. The global lookup table GLUT may be provided by a manufacturer of the modulation element groups ME1-MEn. For instance, under ideal circumstances, the modulation element groups ME1-MEn respond to the driving signals SD1-SDn with a voltage value of V1 to modulate the initial electromagnetic wave IEM to an electromagnetic wave signal with a resonance frequency FR1, a modulation intensity I1, and a modulation phase PH1 (i.e., a modulation result). The modulation element groups ME1-MEn respond to the driving signals SD1-SDn with a voltage value of V2 to modulate the initial electromagnetic wave IEM to an electromagnetic wave signal with a resonance frequency FR2, a modulation intensity I2, and a modulation phase PH2.

In step S210, the modulation device 100 applies the global lookup table GLUT to perform a test on the modulation elements in a region to be tested in the modulation device 100 and receives a local modulation result MR corresponding to the region to be tested in step S220. In the present embodiment, the local modulation result MR includes a voltage value of the driving signal received by the modulation elements corresponding to the region and/or the resonance frequency, the modulation intensity, and the modulation phase.

In some embodiments, the modulation device 100 may receive the local modulation result MR through a receiving element (not shown).

In step S230, whether the local modulation result MR complies with product qualification specifications is determined. If the local modulation result MR is determined as not complying with the product qualification specifications, this indicates that the modulation elements in the region to be tested are abnormal. The abnormality may not be remedied by changing the driving signal. Therefore, the modulation device 100 reports the abnormality of the modulation element group in the region to be tested, the driving signals, and the measurement results in step S240.

On the other hand, if the local modulation result MR is determined as complying with the product qualification specifications, the modulation device 100 establishes a local lookup table LLUT corresponding to the region to be tested based on the local modulation result MR in step S250.

In the present embodiment, the region #1 is taken as an example. The local lookup table LLUT includes columns C8-C12. The column C12 records the region #1 of the region to be tested. The column C8 records the voltage value of the driving signal received by the modulation element group in the region #1. The column C9 records the resonance frequency of the modulation element group in the region #1. The column C10 records the modulation intensity of the modulation element group in the region #1. The column C11 records the modulation phase of the modulation element group o in the region #1. The local lookup table LLUT provided in the disclosure includes at least one of the modulation phase, the modulation intensity, the resonance frequency, and the voltage value corresponding to the modulation element group in the region #1. The content of the local lookup table LLUT of the disclosure should however not be construed as a limitation in the disclosure.

In step S260, the modulation device 100 determines whether the region to be tested is the last region. If the region to be tested is not the last region, the modulation device 100 selects the next region as the region to be tested (e.g., the region #2) and return to step S210. Based on the steps S220 and S250, the modulation device 100 generates a local lookup table corresponding to the region #2. If the region to be tested (e.g., the region #2) is the last region, the modulation device 100 integrates the local lookup table LLUT corresponding to the region #1 and the local lookup table corresponding to the region #2 into a combined lookup table RLUT and converts the combined lookup table RLUT into the beamforming table BFT in step S270.

In the present embodiment, the combined lookup table RLUT includes columns C8' to C12'. The column C12' records the regions #1 and #2 of the region to be tested. The column C8' records the voltage values of the driving signals received by the regions #1 and #2. The column C9' records the resonance frequencies of the regions #1 and #2. The column C10' records the modulation intensities of the regions #1 and #2. The column C11' records the modulation phases of the regions #1 and #2. Each region to be tested includes one or more modulation elements, and each modulation element in the region to be tested has the same physical parameters. The combined lookup table RLUT provided in the disclosure includes at least one of the modulation phases, the modulation intensities, the resonance frequencies, and the driving voltage values corresponding to the modulation elements in the regions #1 and #2. The content of the combined lookup table RLUT provided in the disclosure is not limited to what is disclosed in this embodiment.

The region R3 in the combined lookup table RLUT is similar to the local lookup table LLUT in the region #1. The region R4 in the combined lookup table RLUT is similar to the local lookup table in the region #2.

In the present embodiment, the number of the local lookup table may increase with the number of the region to be tested, and the number of the region in the combined lookup table RLUT also increases.

In some embodiments, when the number of the local lookup table is one, the combined lookup table RLUT is equal to the local lookup table.

In the present embodiment, the modulation device 100 converts the combined lookup table RLUT to generate the beamforming table BFT based on the modulation phase, the modulation intensity, the resonance frequency, and other responses in the combined lookup table RLUT.

For instance, the modulation device 100 may calculate a corresponding impedance distribution, a corresponding interference pattern distribution, or a corresponding phase distribution on an antenna surface through the behavior of an incident radiation field of the antenna and an outgoing field in different radiation directions. These distributions may then be discretized into the modulation phase, the modulation intensity, or the required resonance frequency at different positions on the antenna.

Therefore, the modulation device 100 may calculate the required modulation phase, the required modulation intensity, or the required resonance frequency at different positions based on a specific radiation direction ($\theta1$, $\varphi1$) (as shown in FIG. 3). For instance, the region #1 requires the modulation phase PH1, the modulation intensity I1, or the resonance frequency RF1. For instance, the region #2 requires the modulation phase PH2, the modulation intensity I2, or the resonance frequency RF2. Through the combined lookup table RLUT in FIG. 7, the corresponding modulation voltage may be found (e.g., the voltage value for the region #1 is VB1, and the voltage value for the region #2 is VB2'). The voltage values VB1 and VB2' may be recorded in the form of the beamforming table BFT in the memory element 110 depicted in FIG. 1, e.g., recording the radiation direction ($\theta1$, $\varphi1$), the voltage value VB1, the region #1, so as to calculate the radiation direction ($\theta1$, $\varphi1$) modulated by the voltage values V1 and V2 shown in FIG. 3.

The modulation device 100 may calculate the required modulation phase, the required modulation intensity, or the required resonance frequency at different positions based on a specific radiation direction ($\theta2$, $\varphi2$) (as shown in FIG. 3). For instance, the region #1 requires the modulation phase PH2, the modulation intensity I2, or the resonance frequency RF2. For instance, the region #2 requires the modulation phase PH1, the modulation intensity I1, or the resonance frequency RF1. The corresponding modulation voltage (such as the voltage value VB1' for the region #1 and the voltage value VB2 for the region #2) may then be found through the combined lookup table RLUT in FIG. 7. The voltage values VB1' and VB2 may be recorded in the form of the beamforming table BFT in the memory element 110 in FIG. 1, e.g., recording the radiation direction ($\theta1$, $\varphi1$), the voltage value VB1', and the region #1, so as to calculate the radiation direction ($\theta1$, $\varphi1$) modulated by the voltage values V1' and V2' shown in FIG. 3.

In some embodiments, the modulation device 100 may execute steps S230-S270 through an external device (not shown) and record the final required beamforming table BFT in the memory element 110 depicted in FIG. 1. In some embodiments, algorithm table information (e.g., the global lookup table GLUT, the local lookup table LLUT, the combined lookup table RLUT) may be backed up in the memory element 110 for subsequent debugging or re-calibration comparison.

Figure 8A:
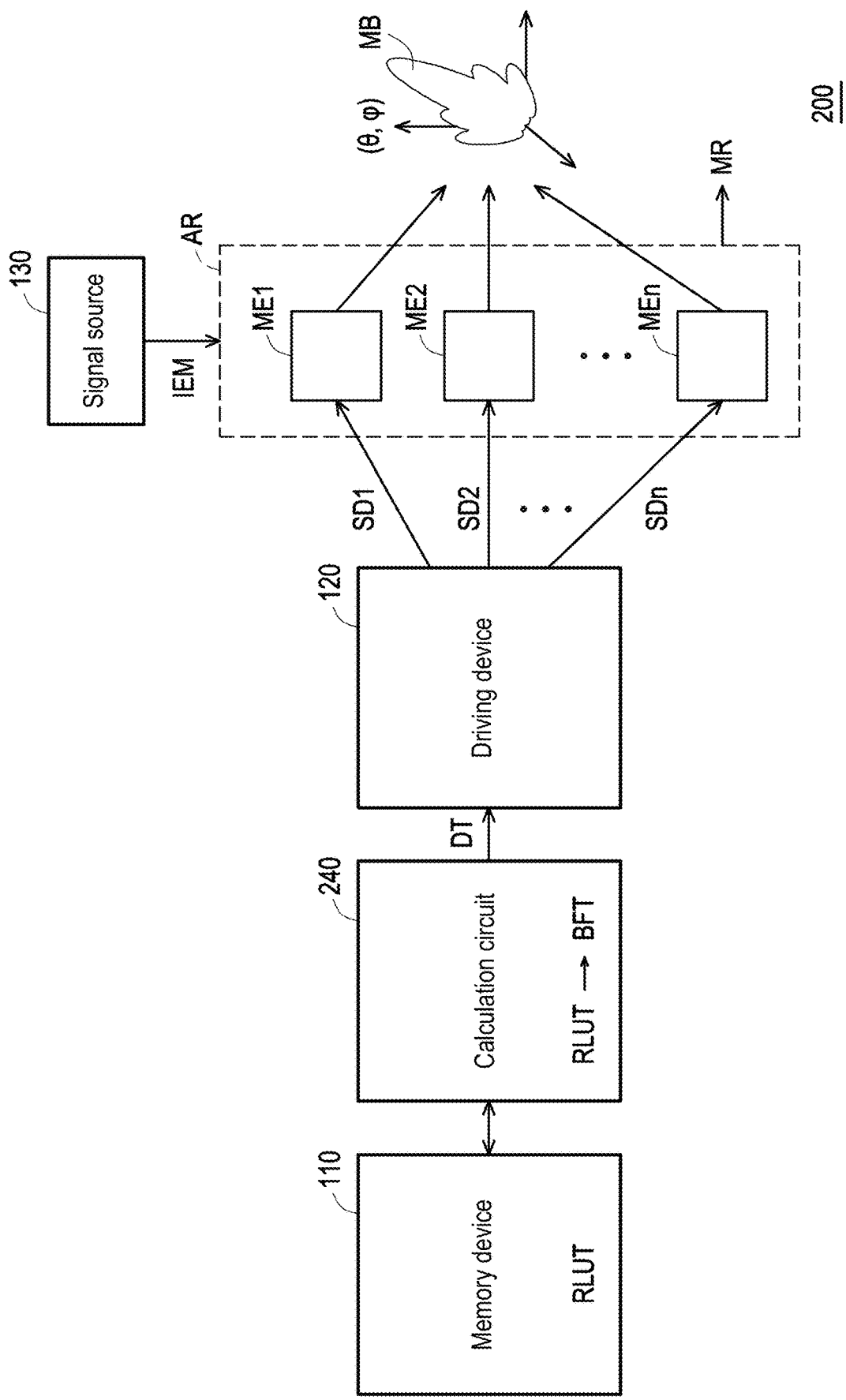
FIG. 8A and FIG. 8B are schematic views respectively illustrating a modulation device according to an embodiment of the disclosure.

Please refer to FIG. 4 and FIG. 8A. FIG. 8A is a schematic view illustrating a modulation device according to an embodiment of the disclosure. In the present embodiment, a modulation device 200 includes the memory element 110, the driving element 120, the modulation element groups ME1-MEn, the signal source 130, and a calculation circuit 240. The implementation manner of the memory element 110, the driving element 120, the modulation element groups ME1-MEn, and the signal source 130 has been clearly explained in at least the embodiment depicted in FIG. 1 and thus will not be repeated here. In the present embodiment, the calculation circuit 240 is electrically connected to the memory element 110 and the driving element 120. The memory element 110 may store the combined lookup table RLUT in step S270. The calculation circuit 240 converts the combined lookup table RLUT into the beamforming table BFT to further reduce the occupied space of the memory element 110.

Figure 8B:
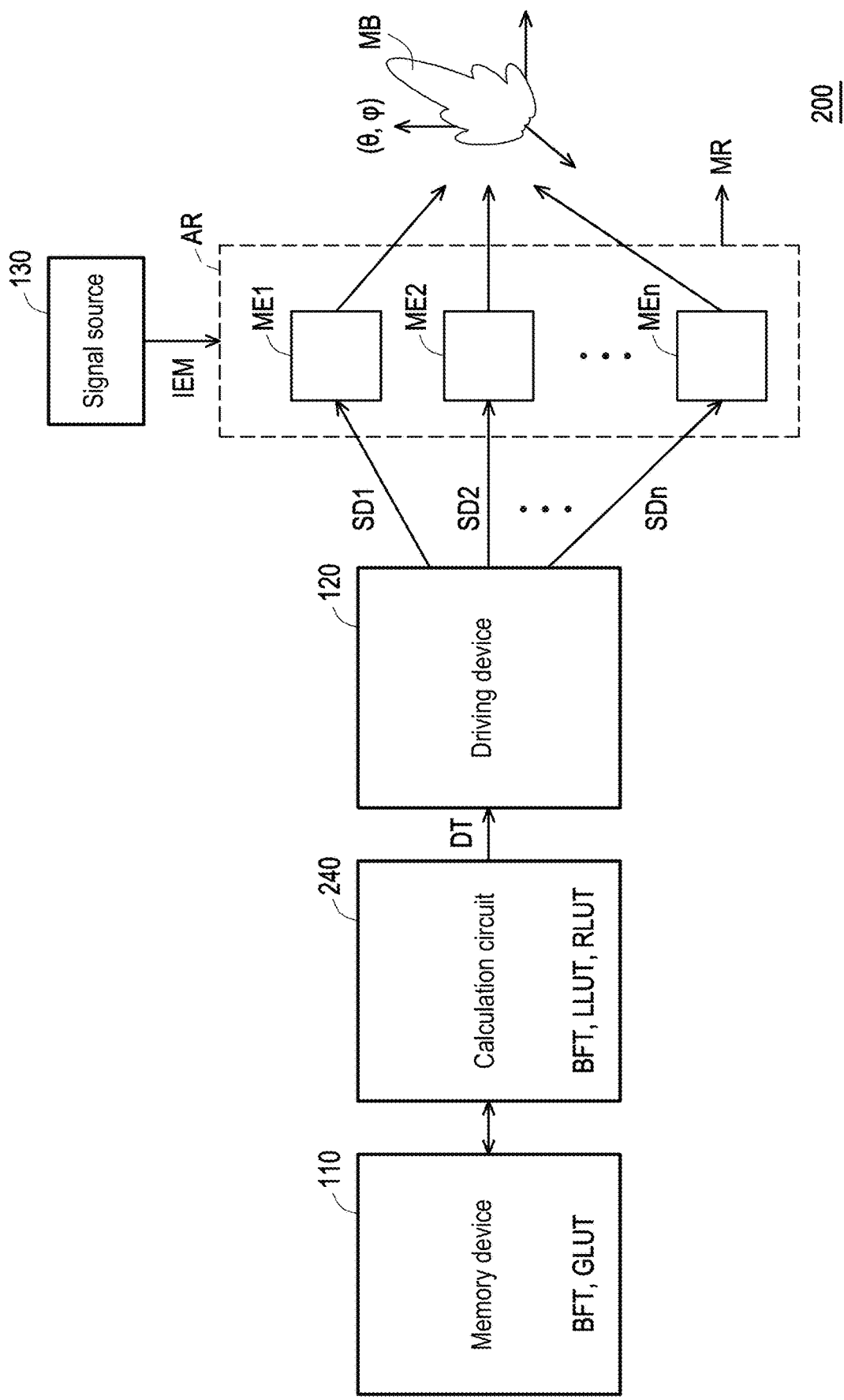

In another embodiment, please refer to FIG. 4 and FIG. 8B. FIG. 8B is a schematic view illustrating a modulation device according to an embodiment of the disclosure. In this embodiment, the calculation circuit 240 is electrically connected to the memory element 110 and the driving element 120. The calculation circuit 240 may execute steps S230-S270. To be specific, the calculation circuit 240 establishes at least one local lookup table LLUT and combines the at least one local lookup table LLUT to generate the combined lookup table RLUT. The calculation circuit 240 then calculates and generates a wave beam that conforms to the beamforming table BFT based on the combined lookup table RLUT, thereby reducing an error rate in the process of wave beam generation, which should however not be construed as a limitation in the disclosure.

In the present embodiment, the calculation circuit 240 is, for instance, a central processing unit (CPU) or any other programmable general-purpose or special-purpose microprocessor, digital signal processor (DSP), programmable controller, application specific integrated circuit (ASIC), programmable logic device (PLD), any other similar device, or a combination of these devices, which can load and execute computer programs.

In some embodiments, the memory element 110 may be integrated into the calculation circuit 240.

Figure 9:
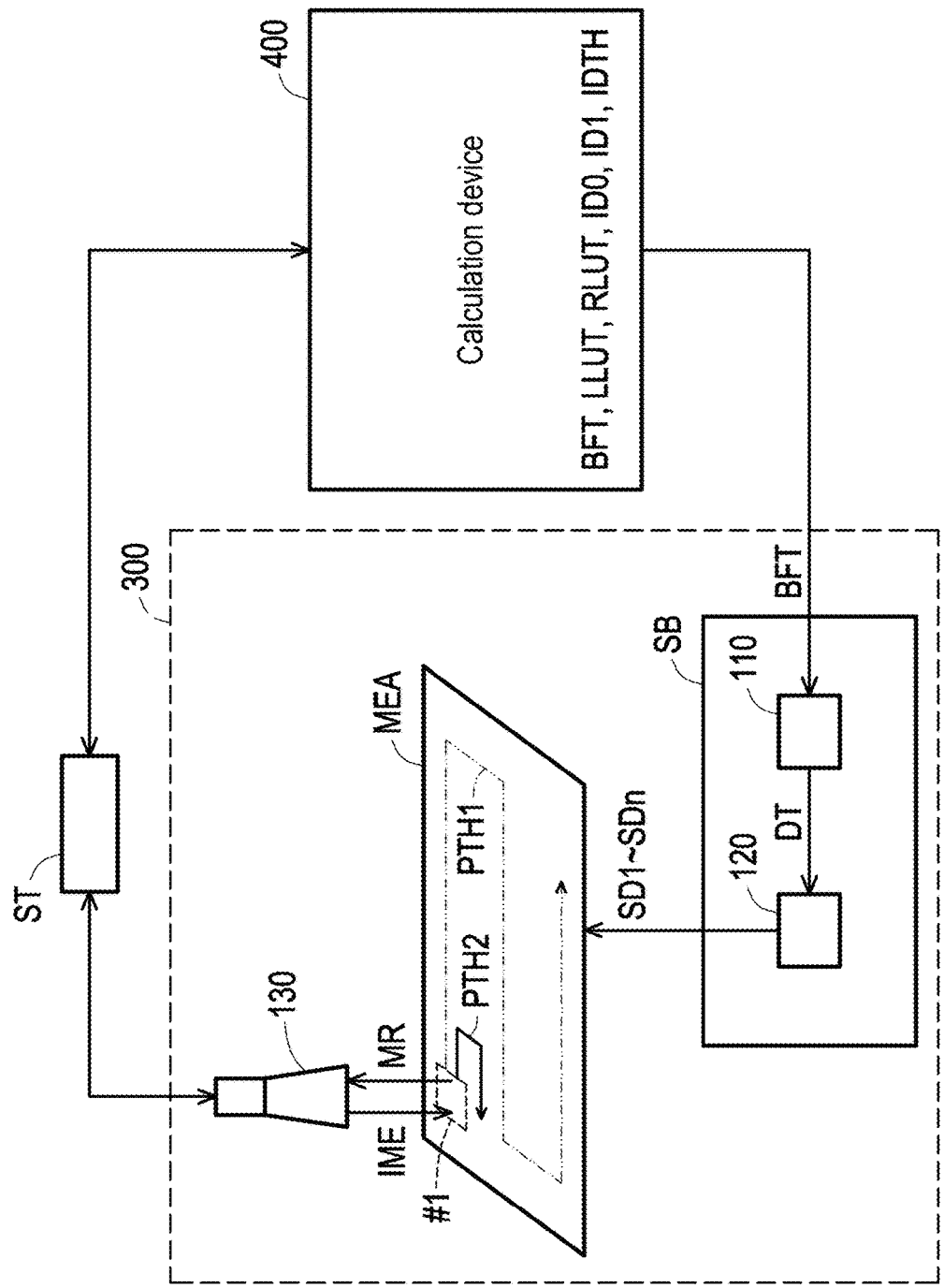
FIG. 9 is a schematic view illustrating a measurement scheme according to an embodiment of the disclosure.

Please refer to FIG. 4 and FIG. 9. FIG. 9 is a schematic view illustrating a measurement scheme according to an embodiment of the disclosure. In the measurement scheme provided in the present embodiment, a modulation device 300 includes the memory element 110, the driving element 120, a modulation element array MEA, and the signal source 130. The memory element 110 and the driving element 120 are disposed on a substrate SB. The memory element 110 and the driving element 120 may form a driving circuit. In the present embodiment, the substrate SB may be a control board of the modulation device 300. The modulation element array MEA includes a plurality of modulation element groups.

In the present embodiment, the signal source 130 is controlled by the calculation device 400. The calculation device 400 controls the signal source 130 through a test board ST, thereby providing the initial electromagnetic wave IEM to the region #1 (also known as a micro-region or a local region) in the modulation element array MEA. In addition, the calculation device 400 receives the local modulation result MR corresponding to the region #1 through the signal source 130 and the test board ST. In other words, the local modulation result MR refers to a reflected electromagnetic wave generated by the modulation elements modulating the initial electromagnetic wave IEM in the region #1.

After receiving the local modulation result MR, the calculation device 400 determines in step S230 whether the local modulation result MR complies with the product qualification specifications. If the local modulation result MR is determined as not complying with the product qualification specifications, this indicates that the modulation elements in the region to be tested are abnormal. The abnormality may not be remedied by changing the driving signal. Therefore, the calculation device 400 reports the abnormality of the modulation elements in the region to be tested in step S240.

On the other hand, if the local modulation result MR is determined as complying with the product qualification specifications, the calculation device 400 establishes the local lookup table LLUT corresponding to the region to be tested based on the local modulation result MR in step S250.

In step S260, the calculation device 400 determines whether the region to be tested is the last region. If the region to be tested is not the last region, the calculation device 400 selects the next region as the region to be tested (e.g., the region #2). Therefore, the modulation device 300 generates the local lookup table corresponding to the region #2. If the region to be tested (e.g., the region #2) is the last region, the calculation device 400 integrates the local lookup table LLUT corresponding to the region #1 and the local lookup table corresponding to the region #2 into the combined lookup table RLUT in step S270 and converts the combined lookup table RLUT into the beamforming table BFT. The calculation device 400 provides the beamforming table BFT to the memory element 110.

In the present embodiment, the calculation device 400 may control the signal source 130 to correspond to the next region to be tested through the test board ST. The signal source 130 may be controlled to move along paths PTH1 and PTH2. The path PTH1 may pass all regions of the modulation element array MEA. The path PTH2 may simply pass through at least one specific region of the modulation element array MEA (such as at least one of corner regions and a central region of the modulation element array MEA).

In the present embodiment, the calculation device 400 may be an electronic device with computing capabilities, such as a server, a desktop computer, a tablet computer, a laptop computer, and so on.

In some embodiments, the test board ST may be integrated into the calculation device 400.

In some embodiments, the modulation element array MEA may be moved, so as to enable the next region to be tested to correspond to the location of the signal source 130. For instance, the location of the signal source 130 may be fixed.

In some embodiments, the memory element 110 and the driving element 120 are respectively disposed on different substrates.

In some embodiments, the shape of the region to be tested and the area occupied by the region to be tested may be determined by the shape of an aperture of a spatial filter and the area occupied by the aperture of the spatial filter.

Figure 10:
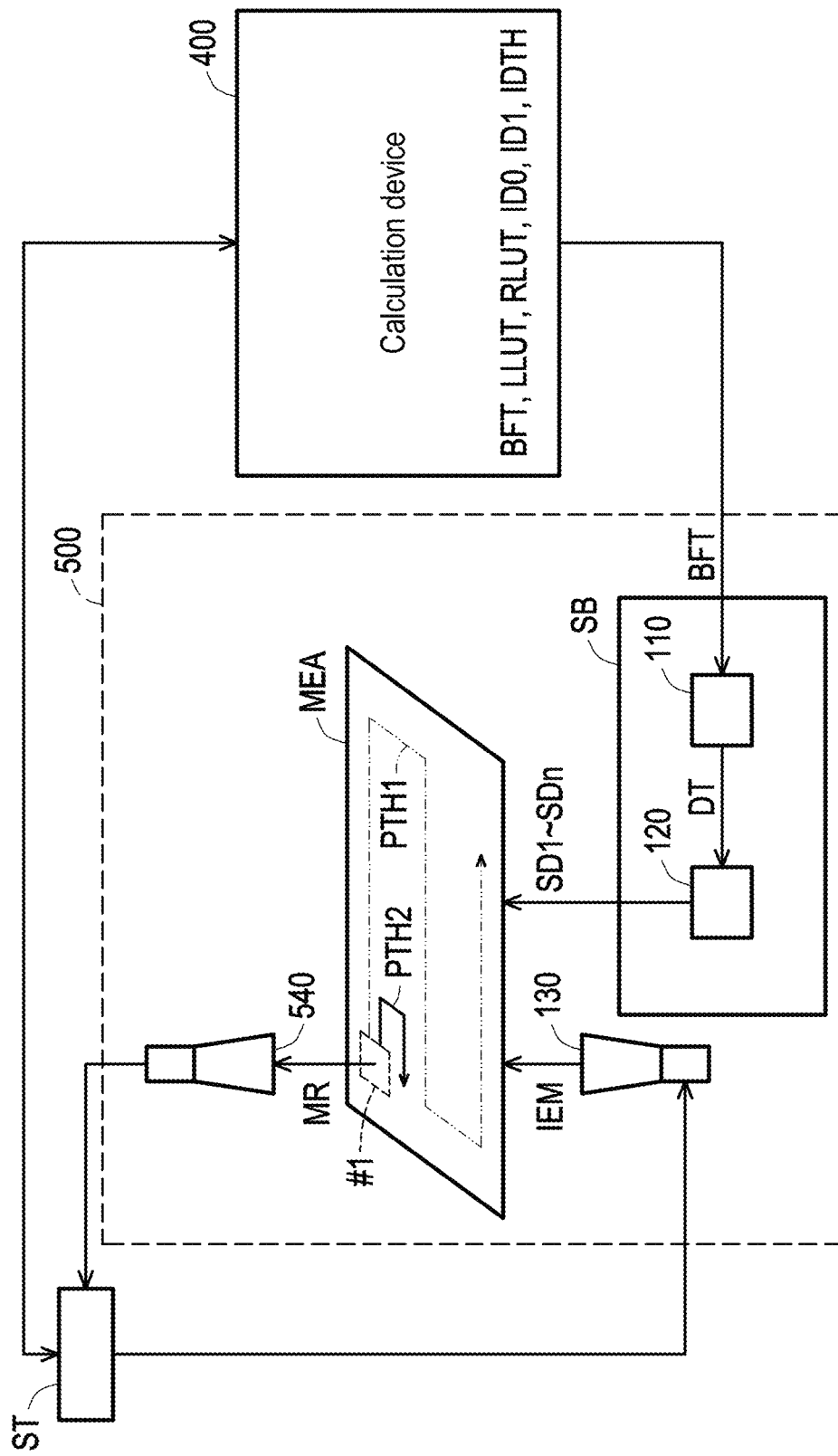
FIG. 10 is a schematic view illustrating a measurement scheme according to an embodiment of the disclosure.

Please refer to FIG. 10, which is a schematic view illustrating a measurement scheme according to an embodiment of the disclosure. In the measurement scheme provided in this embodiment, a modulation device 500 includes the memory element 110, the driving element 120, the modulation element array MEA, the signal source 130, and a receiver 540. The memory element 110 and the driving element 120 are disposed on the substrate SB. In the present embodiment, the substrate SB may be a control board of the modulation device 300. The modulation element array MEA includes a plurality of modulation element groups.

In the present embodiment, the signal source 130 faces a first side of the modulation element array MEA. The calculation device 400 controls the signal source 130 through the test board ST, thereby providing the initial electromagnetic wave IEM to the first side of the modulation element array MEA. The receiver 540 faces a second side of the modulation element array MEA, and the second side is opposite to the first side. The calculation device 400 controls the receiver 540 through the test board ST, thereby obtaining the local modulation result MR of the initial electromagnetic wave IEM from the first side of the modulation element array MEA in the region #1. In other words, the local modulation result MR is a penetrating electromagnetic wave generated by the modulation elements modulating the initial electromagnetic wave IEM in the region #1.

The implementation manner of the calculation device 400 and the paths PTH1 and PTH2 has been clearly explained in at least the embodiment depicted in FIG. 9 and thus will not be repeated hereinafter.

Figure 11:
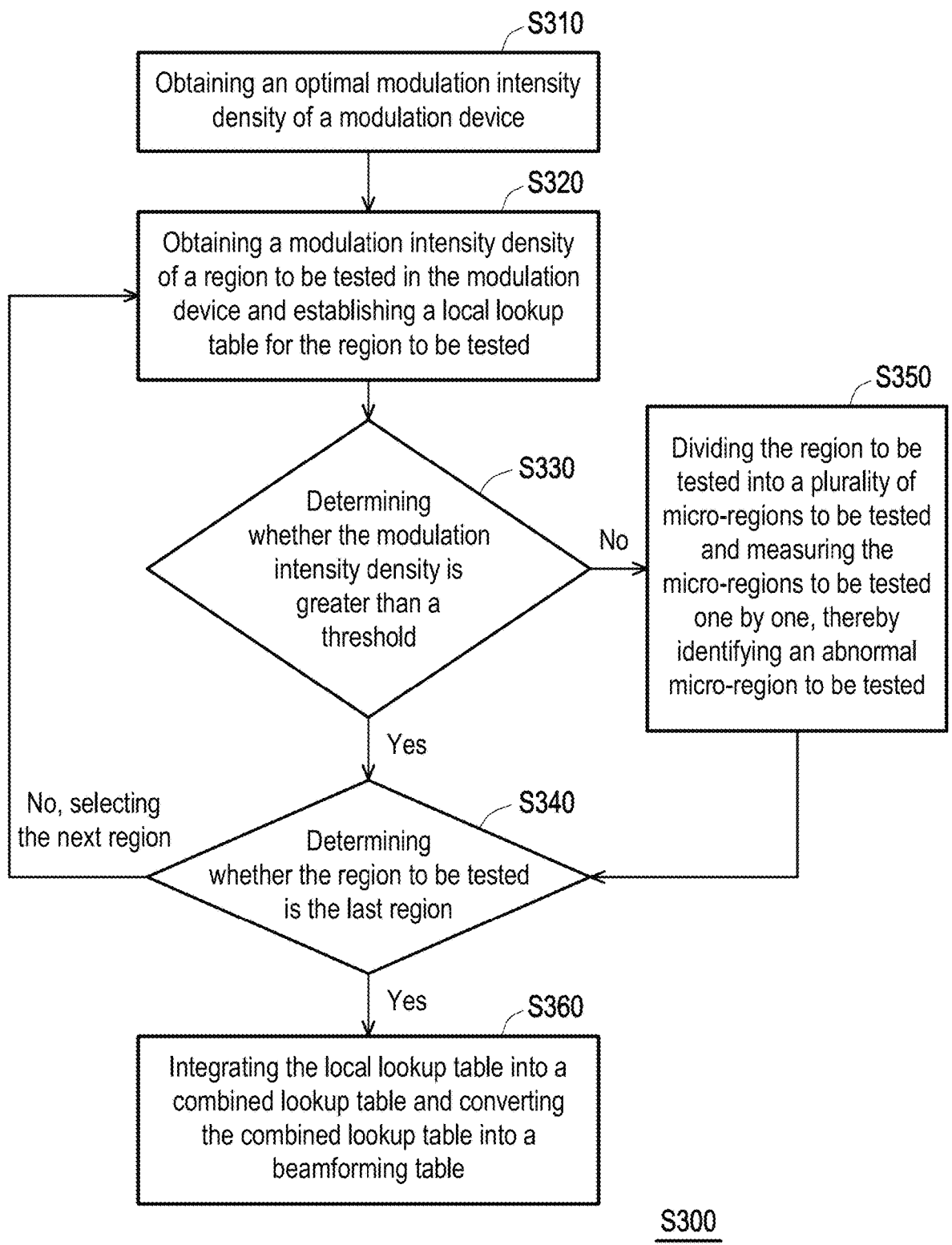
FIG. 11 is a flowchart illustrating a modulation method according to an embodiment of the disclosure.

Please refer to FIG. 9 and FIG. 11. FIG. 11 is a flowchart illustrating a modulation method according to an embodiment of the disclosure. In the present embodiment, a modulation method S300 includes steps S310-S360. In step S310, an optimal modulation intensity density ID0 of the modulation device 300 is obtained. For instance, the region to be tested in the modulation element array MEA is reduced to generate a micro-region to be tested. The area occupied by the micro-region to be tested is smaller than the original to-be-tested area of the region #1. The signal source 130 may be controlled to move along one of the paths PTH1 and PTH2. Therefore, the calculation device 400 may obtain a plurality of modulation intensity densities of a plurality of micro-regions to be tested. The modulation intensity densities are respectively quotients obtained by dividing the modulation intensities by the respective area occupied by the micro-regions to be tested. The calculation device 400 also obtains the optimal modulation intensity density ID0 among the modulation intensity densities.

In step S320, a modulation intensity density ID1 of the region to be tested in the modulation device 300 is obtained. For instance, the signal source 130 may be controlled to move along the path PTH1. Based on the original to-be-tested area of the region to be tested (e.g., the region #1), the calculation device 400 receives the local modulation result MR corresponding to the region to be tested. Therefore, the calculation device 400 may obtain the modulation intensity density ID1 of the region to be tested. In step S320, the calculation device 400 establishes the local lookup table LLUT for the region to be tested.

In step S330, the calculation device 400 determines whether the modulation intensity density ID1 is greater than a threshold IDTH. The calculation device 400 may determine the threshold IDTH based on the optimal modulation intensity density ID0. For instance, the threshold IDTH may be 0.8 times the optimal modulation intensity density ID0 (i.e., IDTH=0.8×ID0), which should however not be construed as a limitation in the disclosure.

When the modulation intensity density ID1 is greater than the threshold IDTH, the calculation device 400 determines in step S340 whether the region to be tested is the last region. On the other hand, when the modulation intensity density ID1 is less than or equal to the threshold IDTH, this indicates that at least one modulation element in the region to be tested may be abnormal. Therefore, the region to be tested is divided into a plurality of micro-regions to be tested in step S350. In step S350, the calculation device 400 controls the signal source 130 to measure the micro-regions to be tested in the region to be tested one by one, thereby identifying the abnormal micro-region to be tested.

In step S340, if the region to be tested is not the last region, the calculation device 400 selects the next region as the region to be tested (e.g., the region #2) and returns to step S320. On the other hand, if the region to be tested (e.g., the region #2) is the last region, the modulation device 100 integrates the local lookup table LLUT corresponding to the region #1 and the local lookup table corresponding to region #2 into the combined lookup table RLUT in step S360 and converts the combined lookup table RLUT into the beamforming table BFT.

The implementation manner of step S360 is similar to the implementation manner of step S270 and may refer to the embodiments shown in FIG. 4, FIG. 6, and FIG. 7 and thus will not be repeated hereinafter.

To sum up, in the modulation method and the modulation device provided in one or more embodiments of the disclosure, the modulation elements are driven according to the beamforming table, thereby modulating at least one initial electromagnetic wave to the main wave beam with the specific radiation waveform. Thereby, the beamforming specifications of the main wave beam may be adjusted based on the beamforming table. In addition, the modulation method disclosed herein provides a measurement scheme for the modulation device, thereby identifying abnormal micro-regions to be tested in the modulation device.

The above embodiments are used to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A modulation method for modulating beamforming, the modulation method comprising:
    providing a memory element storing a beamforming table;
    providing a driving element, wherein the driving element is electrically connected to the memory element;
    providing a plurality of modulation element groups, wherein the plurality of modulation element groups are electrically connected to the driving element;
    providing a signal source, wherein the signal source provides at least one initial electromagnetic wave to the plurality of modulation element groups;
    providing a plurality of driving signals corresponding to the plurality of modulation element groups by the driving element according to the beamforming table; and
    modulating the at least one initial electromagnetic wave to a main wave beam with a specific radiation waveform by the plurality of modulation element groups according to the plurality of driving signals.

2. The modulation method as claimed in claim 1, wherein each of the plurality of modulation element groups comprises at least one modulation element.

3. The modulation method as claimed in claim 2, wherein each of the at least one modulation element is one of a varactor element, a varactor diode, and a radio frequency radiation element.

4. The modulation method as claimed in claim 1, wherein the beamforming table comprises a plurality of radiation directions corresponding to a plurality of regions occupied by the plurality of modulation element groups and the plurality of driving signals.

5. The modulation method as claimed in claim 1, wherein the plurality of modulation element groups are disposed in an active region, the active region is divided into at least one region, and the modulation method further comprises:
performing a test on at least one modulation element in the at least one region to generate at least one local modulation result of the at least one initial electromagnetic wave; and
establishing at least one local lookup table based on the at least one local modulation result.

6. The modulation method as claimed in claim 5, wherein each of the at least one local lookup table comprises at least one of a modulation phase, a modulation intensity, a resonance frequency, and voltage values of the plurality of driving signals corresponding to the plurality of regions occupied by the modulation element groups.

7. The modulation method as claimed in claim 5, further comprising:
combining the at least one local lookup table into a combined lookup table; and
converting the combined lookup table into the beamforming table.

8. The modulation method as claimed in claim 5, wherein the step of performing the test on the at least one modulation element in the at least one region to generate the at least one local modulation result of the at least one initial electromagnetic wave comprises:
performing a test on the at least one modulation element in the at least one region by applying a global lookup table.

9. The modulation method as claimed in claim 5, further comprising:
in the at least one local modulation result, when a first local modulation result corresponding to a first region of the at least one region does not meet qualification specifications, reporting an abnormality, a driving signal, and a measurement result of the at least one modulation element in the first region.

10. A modulation device, comprising:
a memory element, configured to store a beamforming table;
a driving element, electrically connected to the memory element;
a plurality of modulation element groups, electrically connected to the driving element; and
a signal source, configured to provide at least one initial electromagnetic wave to the plurality of modulation element groups,
wherein the driving element provides a plurality of driving signals corresponding to the plurality of modulation element groups according to the beamforming table, and
the plurality of modulation element groups modulate the at least one initial electromagnetic wave to a main wave beam with a specific radiation waveform according to the plurality of driving signals.

11. The modulation device as claimed in claim 10, wherein each of the plurality of modulation element groups comprises at least one modulation element.

12. The modulation device as claimed in claim 11, wherein each of the at least one modulation element is one of a varactor element, a varactor diode, and a radio frequency radiation element.

13. The modulation device as claimed in claim 10, wherein the beamforming table comprises a plurality of radiation directions corresponding to a plurality of regions occupied by the plurality of modulation element groups and the plurality of driving signals.

14. The modulation device as claimed in claim 10, wherein the plurality of modulation element groups are disposed in an active region, the active region is divided into at least one region, and a test on at least one modulation element in the at least one region is performed to generate at least one local modulation result of the at least one initial electromagnetic wave, and at least one local lookup table is established based on the at least one local modulation result.

15. The modulation device as claimed in claim 14, wherein each of the at least one local lookup table comprises at least one of a modulation phase, a modulation intensity, a resonance frequency, and voltage values of the plurality of driving signals corresponding to the plurality of regions occupied by the plurality of modulation element groups.

16. The modulation device as claimed in claim 14, wherein the modulation device combines the at least one local lookup table into a combined lookup table.

17. The modulation device as claimed in claim 16, wherein the memory element stores the combined lookup table.

18. The modulation device as claimed in claim 16, further comprising:
a calculation circuit, electrically connected to the memory element and the driving element and configured to convert the combined lookup table into the beamforming table.

19. The modulation device as claimed in claim 10, wherein the memory element and the driving element are respectively disposed on different substrates.

20. The modulation device as claimed in claim 10, wherein the memory element and the driving element are respectively disposed on a same substrate.

* * * * *